United States Patent
Sato et al.

(10) Patent No.: US 7,194,329 B2
(45) Date of Patent: Mar. 20, 2007

(54) NUMERICAL CONTROL APPARATUS AND NUMERICAL CONTROL SYSTEM

(75) Inventors: Tomonori Sato, Tokyo (JP); Eiji Hayashi, Tokyo (JP); Yuji Mizukami, Tokyo (JP); Toshiyuki Muraki, Aichi (JP); Akira Iseki, Aichi (JP)

(73) Assignees: Mitsubishi Denki Kabushiki Kaisha, Tokyo (JP); Yamazaki Mazak Corporation, Aichi (JP)

( * ) Notice: Subject to any disclaimer, the term of this patent is extended or adjusted under 35 U.S.C. 154(b) by 0 days.

(21) Appl. No.: 11/289,531

(22) Filed: Nov. 30, 2005

(65) Prior Publication Data

US 2006/0136088 A1  Jun. 22, 2006

(30) Foreign Application Priority Data

Dec. 1, 2004  (JP) ............................. 2004-349061

(51) Int. Cl.
*G06F 19/00* (2006.01)
(52) U.S. Cl. ................. 700/192; 700/159; 700/186
(58) Field of Classification Search ............... 700/97, 700/159, 175, 186, 192–193; 82/1.11; 318/625
See application file for complete search history.

(56) References Cited

U.S. PATENT DOCUMENTS 4,471,676 A * 9/1984 Mason .................... 83/13
5,237,509 A * 8/1993 Ueta et al. ................ 700/193
5,289,622 A * 3/1994 Minagawa ................ 29/27 R
6,163,735 A * 12/2000 Yamada et al. ............ 700/193
6,192,284 B1 * 2/2001 Golden ..................... 700/56
6,341,245 B1 * 1/2002 Ueta et al. ................ 700/194
6,671,573 B2 * 12/2003 Nigazawa et al. ........ 700/193
6,738,679 B2 * 5/2004 Fujita et al. ............... 700/56

FOREIGN PATENT DOCUMENTS

JP  1-147608 A  6/1989
JP  2000-5978 A  1/2000

OTHER PUBLICATIONS

Hori, Yoichi—"Robust and Adaptive Control of a Servomotor using Low Precision Shaft Encoder"—Proceedings of the Industrial Electronics, Control, and Instrumentation Conference, 1993—Published Nov. 15-19, 1993.*

* cited by examiner

*Primary Examiner*—Leo Picard
*Assistant Examiner*—Alexander Kosowski
(74) *Attorney, Agent, or Firm*—Sughrue Mion, PLLC

(57) ABSTRACT

An NC apparatus controls a position of a tool by driving a plurality of shafts with a plurality of servomotors. The shafts includes at least one clamp shaft that can be mechanically clamped or non-clamped. A clamp determining unit determines whether a state of the clamp shaft and outputs a signal based on the state. A correcting unit corrects a position instruction value or a position detection value of at least one shaft other than the clamp shaft based on the signal and a correction value so as to cancel an error in a position of the tool due to movement of the tool performed by the clamp shaft.

6 Claims, 5 Drawing Sheets

NUMERICAL CONTROL APPARATUS AND NUMERICAL CONTROL SYSTEM

BACKGROUND OF THE INVENTION

1. Field of the Invention

The present invention relates to a numerical control apparatus (hereinafter, "NC apparatus") and a numerical control machine tool (hereinafter, "NC system"), and in particular to an NC apparatus that can control a machine tool having a shaft (hereinafter, "clamp shaft") capable of performing clamping, and an NC system that includes the NC apparatus.

2. Description of the Related Art

An NC system controls driving of servomotors having a plurality of shafts with a servo control apparatus to control movement of a tool relative to a workpiece, thereby machining the workpiece. The tool needs to be held rigidly while the machining is on its way. The tool is in generally held rigidly by the shafts of the servomotors. However, to enhance the rigidity, a clamp apparatus that can mechanically fix a position of a shaft, such as a coupling of a meshing type, is used. The clamp apparatus is used on a shaft where a disturbance (cutting resistance) is large relative to a torque capacity of a servomotor. Thus, the clamp apparatus is generally used on a rotary shaft for a turret tool rest or for a turntable.

Although the clamp apparatus enhances the rigidity, its presence can cause a positioning accuracy of the shaft to degrade. When the clamp apparatus is used on a shaft, and if the clamp apparatus is operating (hereafter, "clamping state"), a positional accuracy of the shaft depends mainly on a mechanical precision of the clamp apparatus (for example, precision of a coupling). On the other hand, if the clamp apparatus is not operating (hereafter, "non-clamping state"), the positional accuracy of the shaft depends mainly on a positioning accuracy of the servo motor. As a result, a difference in the position of the shaft occurs between the clamping state and the non-clamping state. If the shaft is positioned with the servomotor in a non-clamping state, and if the shaft is clamped with a clamp apparatus, problems such as generation of noises due to a meshing error or hitting of teeth to each other can occur.

A typical NC lathe can turn a tool rest having a plurality of tool holding faces to determine a desired tool holding face to a predetermined angle. In such an NC lathe, an angle of a motor actually detected in a state that the tool rest has been clamped at a predetermined angle, or an angle error to a reference value is stored, and an angle target value of the motor is corrected, when the tool rest is next positioned at the same angle in the non-clamping state. Accordingly, an angle deviation that occurs when the tool rest is switched to the non-clamping state to the clamping state can be solved. A conventional NC lathe is disclosed in, for example, Japanese Patent Application Laid-open No. 2000-5978 (P. 3 to 5, and Fig. 1).

In the conventional technique, however, only a positional error (angular error) in a moving direction of the clamp shaft (a pivot shaft of the tool rest) that occurs due to a difference between the clamping state and the non-clamping state is set as an object to be corrected. In fact, although very small, positional errors occur even in other directions (for example, an axial direction of the pivot shaft) due to the difference between the clamping state and the non-clamping state. In the conventional technique, the positional error in the other moving directions can not be corrected.

In the conventional technique, a correction for the positional error (the angular error) is performed only in the non-clamping state, and no correction for the positional error is performed in the clamping state. In such a machining process in which machining in the clamping state and machining in the non-clamping state are performed, it is necessary to control the position of a tool with a high accuracy in both of the clamping state and the non-clamping state. In the conventional technique, however, there is a problem that the position of the tool cannot be controlled with a high accuracy neither in the clamping state nor in the non-clamping state.

SUMMARY OF THE INVENTION

It is an object of the present invention to at least solve the problems in the conventional technology.

According to an aspect of the present invention, a numerical control apparatus including a position instruction generating unit that generates and outputs a plurality of position instruction values indicative of a position of a tool of a numerical control machine tool, a plurality of servo controllers each of which controls a corresponding one of a plurality of servomotors in the numerical control machine tool based on a corresponding one of the position instruction values, and a plurality of detectors each of which detects a rotational position of a corresponding one of the servomotors and feeds back a position detection value indicative of detected rotational position to a corresponding one of the servo controllers, each of the servomotors driving a corresponding one of a plurality of shafts, at least one of the shafts being a clamp shaft that can be mechanically clamped and non-clamped, includes a clamp determining unit that determines a state of the clamp shaft, the state including a clamping state in which the clamp shaft is clamped and a non-clamping state in which the clamp shaft is non-clamped, and outputs a clamp state signal indicative of the state of the clamp shaft; and a correcting unit that corrects at least one of a position instruction value and a position detection value corresponding to at least one shaft other than the clamp shaft based on the clamp state signal and a correction value so as to cancel an error in a position of the tool due to a movement of the tool performed by the clamp shaft.

According to another aspect of the present invention, a numerical control machine tool includes a workpiece holding apparatus configured to hold a workpiece; a tool configured to machine the workpiece; a machining head configured to hold the tool; a plurality of shafts configured to be controlled by the workpiece holding apparatus and the machining head so as to move the workpiece and the tool in different directions, the shafts including a clamp shaft; a plurality of servomotors each of which drives a corresponding one of the shafts; a clamp apparatus that mechanically clamps the clamp shaft; and a numerical control apparatus. The numerical control apparatus includes a position instruction generating unit that generates and outputs a plurality of position instruction values indicative of a position of a tool of a numerical control machine tool; a plurality of servo controllers each of which controls a corresponding one of a plurality of servomotors in the numerical control machine tool based on a corresponding one of the position instruction values; a plurality of detectors each of which detects a rotational position of a corresponding one of the servomotors and feeds back a position detection value indicative of detected rotational position to a corresponding one of the servo controllers, each of the servomotors driving a corresponding one of a plurality of shafts, at least one of the shafts being a clamp shaft that can be mechanically clamped and non-clamped; a clamp determining unit that determines a state of the clamp shaft, the state including a clamping state in which the clamp shaft is clamped and a non-clamping state in which the clamp shaft is non-clamped, and outputs a clamp state signal indicative of the state of the clamp shaft; and a correcting unit that corrects at least one of a position instruction value and a position detection value corresponding to at least one shaft other than the clamp shaft based on the clamp state signal and a correction value so as to cancel an error in a position of the tool due to a movement of the tool performed by the clamp shaft.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an NC apparatus and an NC system according to the present invention will be explained below with reference to the accompanying drawings. Note that the invention is not limited by the following embodiments.

Figure 1:
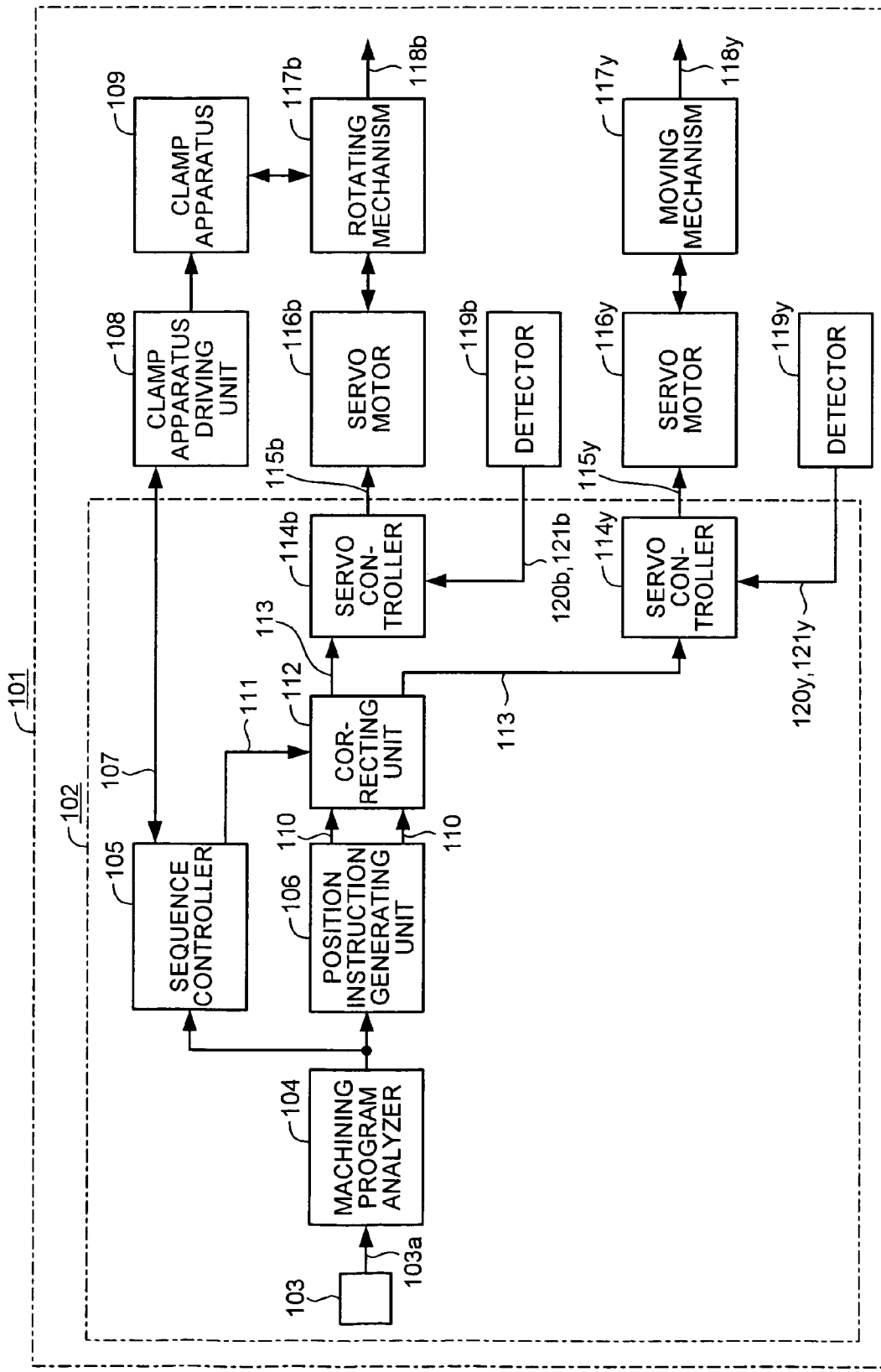
FIG. 1 is a block diagram of a schematic configuration of an NC apparatus and an NC system according to a first embodiment of the present invention.
Figure 2:
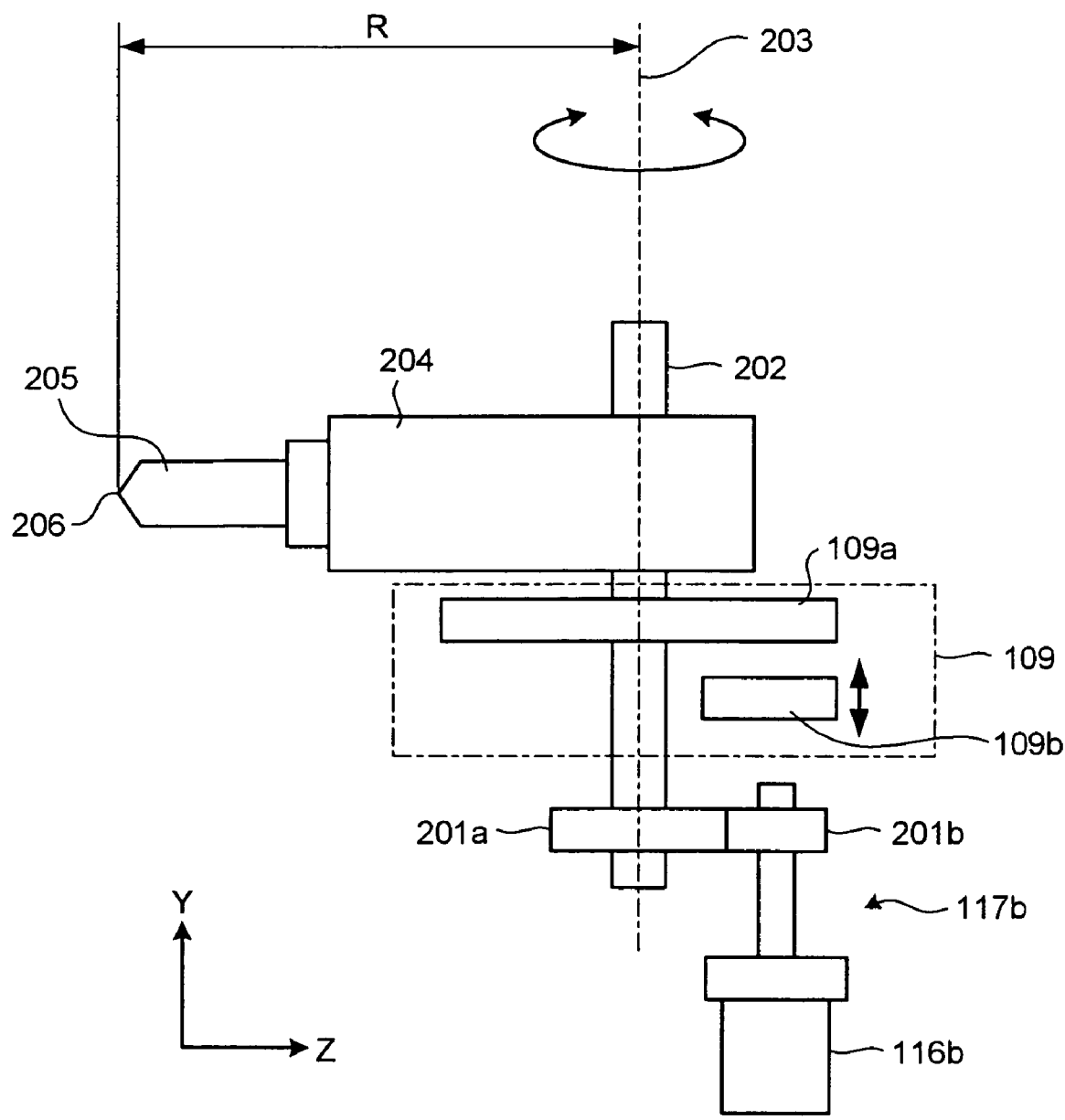
FIG. 2 is a schematic side view of a driving mechanism of a tool rest in the NC system.

FIG. 1 is a block diagram of a schematic configuration of an NC system 101 that includes an NC apparatus 102 according to a first embodiment of the present invention, and FIG. 2 is a schematic diagram of a driving mechanism for a tool rest in the NC system 101.

The NC system 101 is a machine tool, which, in the simplest constitution, includes two shafts: one shaft (B-axis) 202 having a clamp apparatus 109 and another shaft (Y-axis (not shown)).

The NC system 101 includes, apart from the NC apparatus 102, a B-axis servomotor 116b whose driving is controlled by the NC apparatus 102 to rotate a tool rest 204 serving as a machining head around a B-axis, a Y-axis servomotor 116y whose driving is controlled by the NC apparatus 102 to move the tool rest 204 in a Y-axis direction, a rotating mechanism 117b that include a decelerator 201b and a decelerator 201a and transmits rotation of the B-axis servomotor 116b to the tool rest 204 to rotate it, a moving mechanism 117y that converts rotation of the Y-axis servomotor 116y to linear movement to move the tool rest 204 to the Y-axis direction, a detector 119b that detects a rotational position of the B-axis servomotor 116b to output a position detection value 120b, a detector 119y that detects a rotational position of the Y-axis servomotor 116y to output another position detection value 120y, the clamp apparatus 109 that has a clamp-target unit 109a and a clamping unit 109b and clamps the clamp-target unit 109a by the clamping unit 109b to rotationally position the tool rest 204 around the B-axis to fix the same, a clamp apparatus driving unit 108 that drives the clamp apparatus 109, and the like.

The NC apparatus 102 includes a program memory 103 that stores a machining program 103a, a machining program analyzer 104 that reads the machining program 103a from the program memory 103 to analyze the same, a sequence controller 105 that performs sequence control on the clamp apparatus driving unit 108 based on the analysis result of the machining program 103a, a position instruction generating unit 106 that generates position instruction values 110 for the B-axis and the Y-axis of the tool rest 204 based on the analysis result of the machining program 103a, a correcting unit 112 that corrects the generated position instruction values 110 to output correction position instruction values 113, a B-axis servo controller 114b and a Y-axis servo controller 114y that control positions of the tool rest 204 on the B-axis and the Y-axis according to the correction position instruction values 113, and the like. Although the detectors 119b and 119y have been explained as devices belonging to the NC system 101, since they belong to the NC apparatus 102 considering their functions, they are handled as devices belonging to the NC apparatus 102 in this specification.

The sequence controller 105 serving as a clamp determining unit performs transmission and reception of output signal/input signal 107 with the clamp apparatus driving unit 108 to control clamping/non-clamping of the clamp apparatus 109. The sequence controller 105 outputs, to the correcting unit 112, a clamp state signal 111 indicative of whether the clamp apparatus 109 is in a clamping state or in a non-clamping state. The correcting unit 112 corrects the position instruction values 110 according to the clamp state signal 111 to obtain the correction position instruction values 113 and outputs the correction position instruction values 113 to the servo controllers 114b and 114y, which constitutes the important part of the present invention.

The position instruction values 110 and the correction position instruction values 113 are vector values including a plurality of shaft elements, where the "position" includes both a translation position and a rotational angular position. The servo controllers 114b and 114y for the B-axis and the Y-axis control currents 115b and 115y to the respective servomotors 116b and 116y based on given correction position instruction values 113 and respective position detection values 120b and 120y detected by the respective detectors 119b and 119y to drive the rotating mechanism 117b and the moving mechanism 117y by the respective servomotors 116b and 116y, thereby positioning tool positions 118b and 118y to respective B-axis and Y-axis.

Although the machining program analyzer 104 is a part of the NC apparatus 102, the machining program analyzer 104 is not an essential component. Precisely, other means such as necessary information, namely information about movements (route and speed) or about the clamping state or the non-clamping state, can be provided by a manual operation of an operator.

The driving mechanism for the tool rest 204 serving as the machining head will be explained with reference to FIG. 2. The rotating mechanism 117b for the tool rest 204 includes the decelerators 201b and 201a and the B-axis 202 serving as a tool rest pivot shaft. The B-axis servomotor 116b rotates the B-axis 202 around a B-axis rotating center 203 via the decelerators 201b and 201a to turn the tool rest 204. A workpiece (not shown) is machined by a tool 205 held as a tool at an end face of the tool rest 204. The B-axis 202 is disposed in parallel with the Y-axis on a coordinate system shown in FIG. 2. The clamp apparatus 109 having the clamp unit 109b and the clamp-target unit 109a is provided on the B-axis 202, where the tool rest 204 can be fixed at a predetermined turning angle by fixing the B-axis 202 using the clamp apparatus 109. As the clamp apparatus 109, a coupling apparatus of a meshing type, a brake apparatus utilizing frictional force, or the like can be used.

Though not shown in FIG. 2, the moving mechanism 117y for moving the tool rest 204 in the Y-axis direction is a linearly moving mechanism for translating the whole members of the tool rest 204, the rotating mechanism 117b, the clamp mechanism 109, and the B-axis servomotor 116b in the Y-axis direction and it is driven by the Y-axis servomotor 116. The moving mechanism 117y does not include any clamp mechanism. Though not shown in FIG. 2, the NC system 101 includes a workpiece holding apparatus for holding a machined face of the workpiece at a machining position 206 at a distal end of the tool 205. The workpiece holding apparatus has a rotating main shaft parallel to the Y-axis and chucks the workpiece and rotates the same, while the moving mechanism 117y moves the tool 205 in the Y-axis direction via the tool rest 204 to machine the workpiece while causing relative movement between the workpiece and the tool 205.

Figure 3:
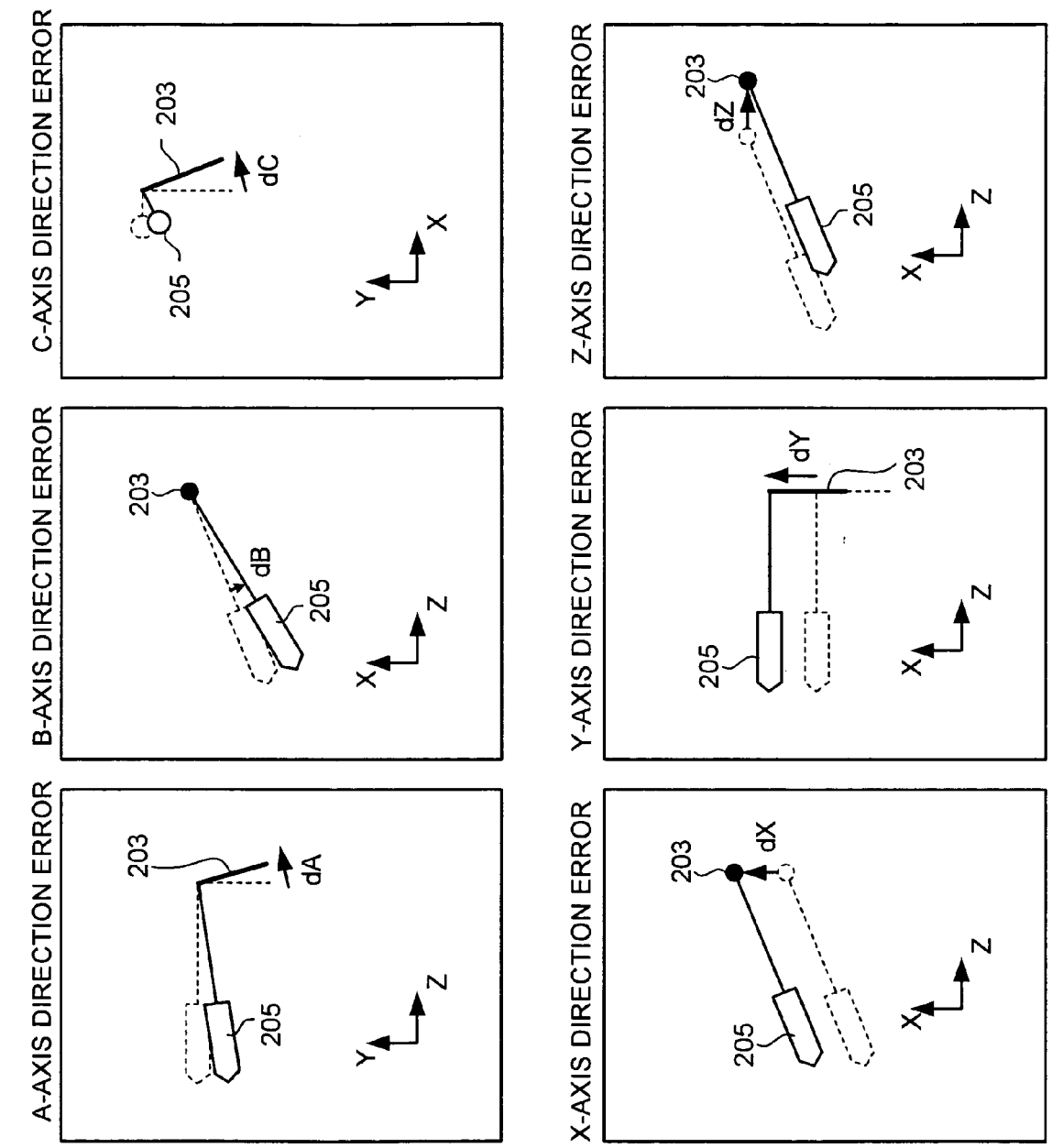
FIG. 3 depicts positional errors generated in displacement directions of the total of six degrees of freedom according to a displacement of a B-axis shown in FIG. 2.

FIG. 3 depicts positional errors of the tool 205 that occur in displacement directions of the total of six degrees of freedom according to displacement of the B-axis 202 shown in FIG. 2. An A-axis direction error indicates a rotational error of the X-axis, a B-axis direction error indicates a rotational error of the Y-axis, a C-axis direction error indicates a rotational error of the Z-axis, and X-, Y-, and Z-axis direction errors indicates translational errors of X-, Y-, and Z-directions.

In the conventional technique described above, only an angular error of the clamp shaft (B-axis) in a rotational direction that occurs due to a difference between the clamping state and the non-clamping state is set to be an object to be corrected. As shown in FIG. 3, however, a positional (angular) error actually occurs in another direction due to the clamping state/the non-clamping state of the B-axis, too and the error takes different values according to the clamping state and the non-clamping state. In general, the displacement directions include a three degrees of freedom (X, Y, Z) for translational displacement and a three degrees of freedom (A, B, C) for rotational displacement. In the NC system 101, since a direction of displacement (movement) conducted by the clamp shaft is the B direction, other displacement (moving) directions are the remaining five displacing (moving) directions of X, Y, Z, A, and C.

Figure 4:
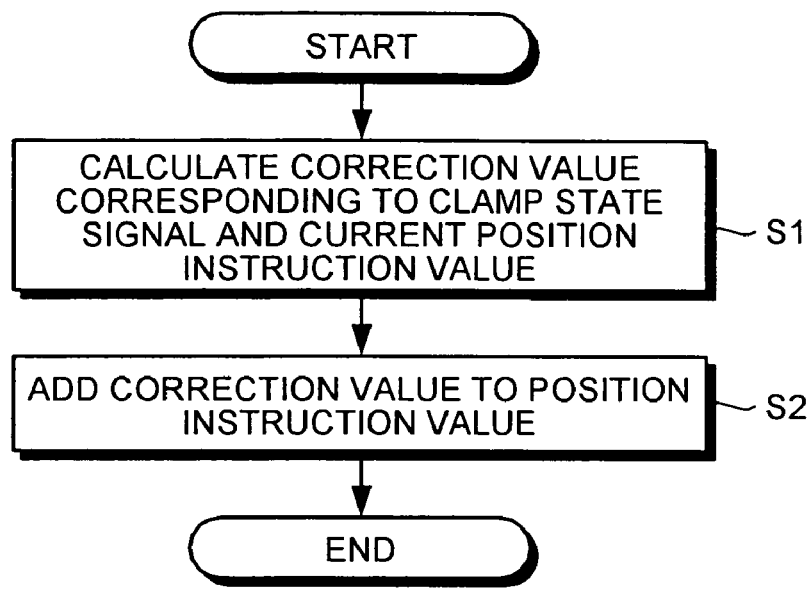
FIG. 4 is a flowchart of a process procedure for correcting position instruction values in a correcting unit shown in FIG. 1.

FIG. 4 is a flowchart of a calculation procedure for the correction position instruction values 113 in the correcting unit 112 shown in FIG. 1. At step S1, a correction value 603 described later is calculated according to the clamp state signal 111 and position instruction values 110 of a current B-axis. A correcting method for a positional error generated in the Y-axis direction in the NC system 101, which operates on two axes, will be explained below.

At step S1, first, when the clamp state signal 111 is represented as CSS, the position instruction value 110 of the B-axis is represented as Br, and the correction value 603 in the Y-axis direction (see FIG. 6) is represented as ΔY, ΔY is can be obtained by the following equation (1).

$$\Delta Y = \Delta Y(CSS, Br) \quad (1)$$

CSS takes different values, 1 or 0, to discriminate the clamping state and the non-clamping state from each other. The correction value 603 is a value obtained by reversing a sign of a positional error so as to cancel a positional error dY that occurs in the Y-axis direction according to a displacement of the tool 205 around the B-axis. The relational equation ΔY (CSS, Br) of the correction value ΔY to the values of CSS and Br is expressed as a relational equation, a table, a neural net, a rule, or the like and stored in a storage unit (not shown) in the correcting unit 112 in advance.

At step S2, the position instruction value 110 of the Y-axis is represented as Yr, and the corrected position instruction value (the corrected position instruction value) 113 of the Y-axis is represented as Yr', so that Yr' is obtained by adding ΔY to Yr (a parameter attached with a sign ' represents a corrected parameter).

$$Yr' = Yr + \Delta Y \quad (2)$$

While the above example is a relational equation of scalar of a positional error in the Y-axis direction which is influenced by the displacement of the tool 205 around the B-axis appears, the positional instruction value 110, the correction value 603, and the correction position instruction value 113 can be handled as a vector including a plurality of shaft elements. Therefore, when these values are represented as Pr, ΔP, and Pr', equations (1) and (2) are replaced with the following equations (3) and (4).

$$\Delta P = \Delta P(CSS, Pr) \quad (3)$$

$$Pr' = Pr + \Delta P \quad (4)$$

As explained above, according to the NC system 101, a correction of the position instruction values 110 are performed according to the respective clamping state and the non-clamping state in both of them, positional errors in both of the clamping state and the non-clamping state can be reduced. Both positional errors in a direction different from the displacement direction of the clamp shaft in the clamping state and the non-clamping state can be reduced.

The constitution, function, and advantage of the NC system 101 have been set forth above, however, additional function and advantage can be obtained by modifying or expanding the following four items described below.

(1) Although the NC system 101 includes only two shafts of the B-axis and the Y-axis as the driving mechanism, when it has more shafts, positional errors in more directions can be corrected correspondingly. For example, when the NC system has three orthogonal shafts (Y, Y, Z), a translation error due to displacement of the tool 205 around the B-axis can be corrected as regards all three degrees of freedom. When the NC system 101 includes another rotational shaft (the A-axis and the C-axis in the NC system) in the NC system 101) different from the clamp shaft (the B-axis in the NC system 101), an orientation error (an inclination of the shaft) of the clamp shaft itself can also be corrected.

(2) In the NC system 101, only the positional error that occurs according to displacement around the B-axis has been taken as the positional error generated in the Y-axis direction, however, a correction value for a position of one shaft (for example, a j-th shaft) can be generally grasped as a total value of positional errors due to many factors generated in the shaft direction. For example, when the positional error generated in the j-th shaft direction includes a positional error due to displacement of the j-th shaft and a positional error due to displacement of another i-th shaft (i≠j) or a positional error due to any other factor (for example, a dynamic error such as backlash or thermal displacement), a total value including these errors can be adopted as a correction value for the j-th shaft, and these positional errors can be corrected similarly.

(3) In the NC system 101, the clamp apparatus 109 selects either one of the clamping state and the non-clamping state, however, a plurality of clamping states or a variable clamping state can be adopted by expanding a range of the selection. For example, a plurality of clamping apparatuses 109 can be provided, or a clamping pressure, a clamping position, or the like of the clamp apparatus 109 can be changed continuously. In this case, the CSS (clamp state signal) can be handled as a parameter capable of taking three or more values (or a continuously changing value) and the above relational equations ΔP (CSS, Pr) for obtaining a correction value are preliminarily stored corresponding to respective values which the CSS can take. By using such a method, even if many clamp apparatuses are provided or a continuously variable clamping state can be taken, a correction is optimally performed to reduce positional errors in any cases.

(4) In the NC system 101, the servo controller 114b and 114y generally performs feedback controls on positions. In that case, however, instead of the constitution that the correction values are added to the position instruction values 110 in the above manner, the correction values can be subtracted from position detection values obtained from the detectors 119b and 119y. With this constitution, when feedforward control is performed, there is a demerit that response delay to the correction values occurs. However, since it is unnecessary to differentiate the correction values added to the position instruction values 110, there is a merit that smooth movement, which does not excite vibrations, can be realized. In the above constitution, the correction values are calculated corresponding to the position instruction values 110, however, calculation can be performed corresponding to the position detection values 120. With such a constitution, correction values with servo delay according to a more accurate position can be obtained.

Figure 5:
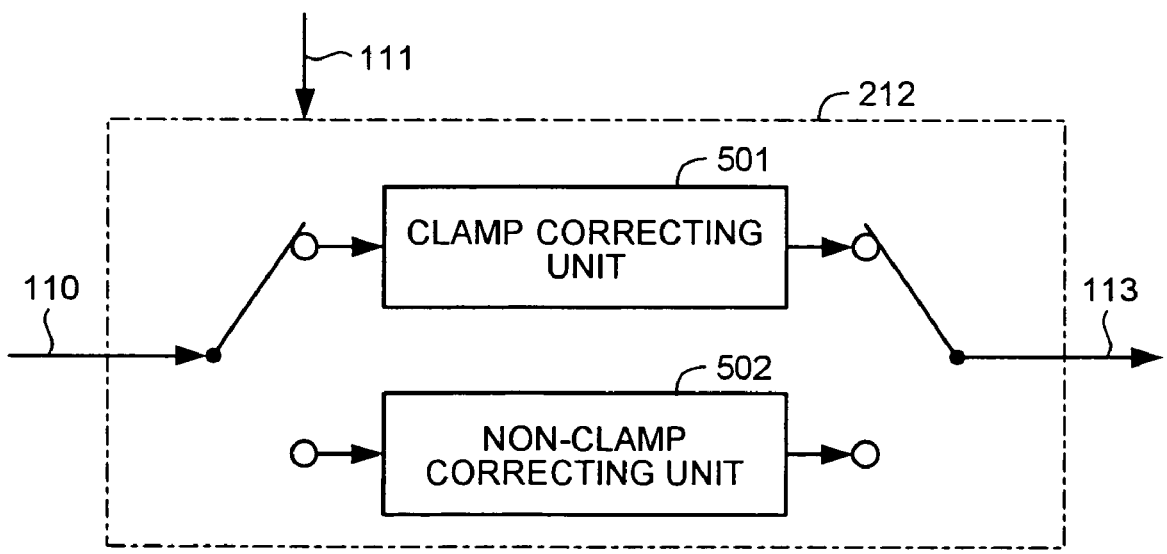
FIG. 5 is a schematic of a configuration of a correcting unit in an NC apparatus according to a second embodiment of the present invention.

FIG. 5 depicts a configuration of a correcting unit 212 according to a second embodiment of the invention. The correcting unit 212 can be used in the NC apparatus 102 shown in FIG. 1 in place of the correcting unit 112. The correcting unit 212 includes a clamp correcting unit 501 and a non-clamp correcting unit 502. When in a clamping state, the clamp correcting unit 501 calculates a correction position instruction value 113 from the clamp state signal 111. When in a non-clamping state, the non-clamp correcting unit 502 calculates a correction position instruction value 113 from the clamp state signal 111.

Figure 6:
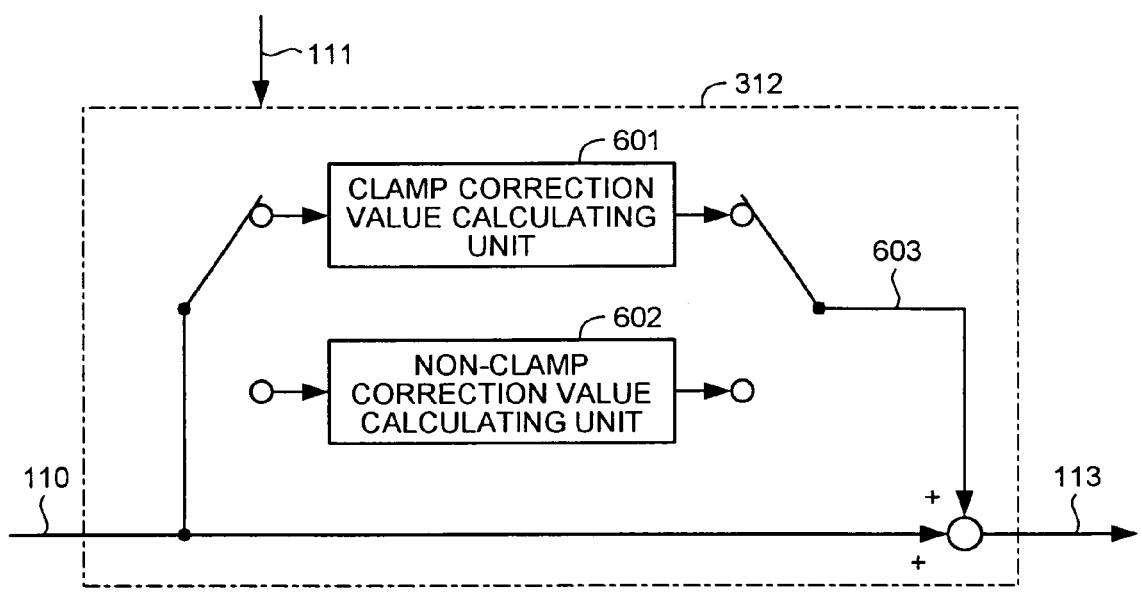
FIG. 6 is a block diagram of another example of the correcting unit in the NC apparatus according to the second embodiment.

A correcting unit 312 shown in FIG. 6 can be used in the NC apparatus 102 shown in FIG. 1 in place of the correcting unit 112. The correcting unit 312 includes a clamp correction value calculating unit 601 serving as the clamp correcting unit and a non-clamp correction value calculating unit 602 serving as the non-clamp correcting unit. When in a clamping state, the clamp correction value calculating unit 601 calculates a correction value 603 from the clamp state signal 111. When in a non-clamping state, the non-clamp correction value calculating unit 602 calculates a correction value 603 from the clamp state signal 111. The correction value calculated in either unit is added to the position instruction value 110 to be outputted to the correction position instruction value 113.

A specific example for obtaining the correction value 603 will be explained below. A case that two shafts of the B-axis including the clamp apparatus 109 and the Y-axis are provided is shown like the NC system 101. A correction for shafts except for the clamp shaft (the B-axis) under the clamping state is performed in the clamp correction value calculating unit 601. That is, using the relational equation ΔYc (Br) for the correction value 603 of the Y-axis to the position of the clamp shaft, a correction value (603) ΔY corresponding to the current position Br of the clamp shaft is obtained.

$$\Delta Y = \Delta Yc(Br) \tag{5}$$

Since precision of the clamp shaft (the B-axis) itself in the clamping state is mechanically determined by the clamp apparatus 109, even if the position instruction value 110 inputted into the servo controller 114b is corrected regarding the clamped shaft, the precision is not affected, so that the correction for the B-axis is not performed.

On the other hand, in the non-clamping state, an error dB that occurs in a displacement direction of the clamp shaft (B-axis) is corrected in the non-clamp correction value calculating unit 602 using the degree of freedom of the clamp shaft (B-axis) itself. That is, when the correction value 603 of the B-axis to the position of the clamp shaft and the correction value 603 of the Y-axis thereto are represented as ΔBu (Br) and ΔYu (Br), a correction value 603 ΔB of the B-axis and a correction value 603 ΔY of the Y-axis corresponding to the current position Br of the clamp shaft are obtained using the following equations (6) and (7).

$$\Delta B = \Delta Bu(Br) \tag{6}$$

$$\Delta Y = \Delta Yu(Br) \tag{7}$$

ΔYc (Br), ΔBu (Br), and ΔYu (Br) are obtained from the results of experiments for measuring positional errors performed preliminarily and are stored in the correcting unit 312.

The correcting units 212 and 312 can be designed for the clamping state and for the non-clamping state independently of each other. Therefore, even if a shaft to be used for controlling or a correction value calculation method (an equation, a calculation rule, or the like) is considerably different between the clamping state and the non-clamping state, a design therefor is easy. In the correcting unit 213 (312), since the clamp correcting unit 501 and the non-clamp correcting unit 502 (the clamp correction value calculating unit 601 and the non-clamp correction value calculating unit 602) can obtain correction values considering only error factors generated in the clamping state and the non-clamping state, error models used for calculation in the clamp correcting unit 501 and the non-clamp correcting unit 502 (or, 601 and 602) (specifically, equations, calculation rules, or the like) become relatively simple so that a merit of reduction in calculation time can be obtained.

As still another example, either one (hereinafter "A") of the correction value calculating units (601 and 602) for the clamping state and for the non-clamping state and a correction value difference calculating unit for obtaining a difference δ in the correction value between the clamping state and the non-clamping state can be provided. One of correction values for the clamping state and for the non-clamping state that is different from A can be obtained as a sum of the correction value 603 of A and the difference δ from the correction value.

It is assumed above that there are two shafts: one shaft (B-axis) attached with the clamp apparatus 109 and another shaft (Y-axis). However, there can be three shafts as in a third embodiment.

In the configuration shown in FIG. 6, for example, a specific example for obtaining correction values 603 in a machine tool including one shaft (B-axis) having the clamp apparatus 109 and other three orthogonal shafts (X-axis, Y-axis, and Z-axis) is explained. Since the clamp shaft (B-axis) itself is uncontrollable in the clamping state, instead, a correction error generated at a machining position (a tool tip) 206 (see FIG. 2) due to a position error ΔB in a displacement direction of the clamp shaft is corrected using a shaft except for the clamp shaft, particularly a straight shaft. Specifically in this case, straight shafts (here, two straight shafts of an X-axis and a Z-axis perpendicular to the B-axis) corresponding to displacement directions for canceling an error in a translational position that occurs at the machining position 206 due to a position error ΔB, in the displacement direction, of the clamp shaft. That is, the correction values 603 are obtained in the following manner.

$$\Delta Z = \Delta Zc(Br) + R(-\cos(Br) + \cos(Br + \Delta Bc(Br))) \quad (8)$$

$$\Delta X = \Delta Xc(Br) + R(-\sin(Br) + \sin(Br + \Delta Bc(Br))) \quad (9)$$

The first items on right-hand sides in equations (8) and (9) are correction values 603 for correcting positional errors in an X-axis direction and the Y-axis direction generated around the B-axis rotation center due to rotational displacement around the B-axis, and they are obtained from the result of experiments performed for measuring positional errors and stored in advance. On the other hand, the second items on right-hand sides in the equations (8) and (9) are items for correcting relative positional errors from the rotation center 203 of the clamp shaft (B-axis) to the machining position 206, where R indicates a distance from the rotation center 203 of the clamp shaft (B-axis) to the rotation center 203, as shown in FIG. 2. The positional error regarding the Y-axis other than these errors is corrected according to the equation (5) like the second embodiment.

On the other hand, positional errors generated in respective displacement directions can be corrected in the non-clamping state using respective shafts including the clamp shaft (B-axis). That is, like the second embodiment, the correction values 603 for the B-axis and for the Y-axis are obtained according to the equations (6) and (7). Further, regarding the X-axis and the Y-axis, positional errors regarding the Z-axis and the X-axis generated around the B-axis rotation center 203 due to displacement around the B-axis are corrected according to the following equations (10) and (11).

$$\Delta Z = \Delta Zu(Br) \quad (10)$$

$$\Delta X = \Delta Xu(Br) \quad (11)$$

In the above, ΔBc (Br), ΔYc (Br), ΔZc (Br), ΔXc (Br), ΔBu (Br), ΔYu (Br), ΔZu (Br), ΔXu (Br) are obtained from the results of experiments for measuring positional errors performed preliminarily and they are stored.

According to the third embodiment, since a shaft in the clamping state is uncontrollable, using another shaft (especially, a straight shaft) instead of the uncontrollable shaft, a correction is performed so as to cancel a positional error of the machining position 206 due to displacement of the clamped shaft itself, so that a machining accuracy is improved even if the shaft is in the clamped state. In the conventional method described above, since a correction of a position error (angular error) is performed only in the non-clamping state and no correction is performed in the clamping state, it is possible to only cancel a difference in position between the clamping state and the non-clamping state (make a relative error zero).

On the other hand, according to the third embodiment, it is made possible to remove positional errors to original target positions (make an absolute error zero) in both of the clamping state and the non-clamping state. The method is especially useful for the NC system 101 and the NC apparatus 102 for performing both of machining in a clamping state (polygonal face machining, diagonal boring, or the like at a specific angle of a workpiece fixed by the clamp apparatus 109) and machining in a non-clamping state (simultaneous 5-axis machining, diagonal boring at an arbitrary angle of a workpiece that cannot be fixed by the clamp apparatus 109, or the like).

According to an aspect of the present invention, since a position instruction value or a position detection value of a shaft except for at least the clamp shaft is corrected based on a preliminarily stored correction value such that a positional error of a tool that occurs due to movement of the tool caused by the clamp shaft depending on whether the clamp shaft is in the clamping state or in the non-clamping state is cancelled, an NC apparatus that can reduce a positional error of a tool due to its movement caused by a clamp shaft in both of the clamping state and the non-clamping state can be provided.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A numerical control apparatus including a position instruction generating unit that generates and outputs a plurality of position instruction values indicative of a position of a tool of a numerical control machine tool, a plurality of servo controllers each of which controls a corresponding one of a plurality of servomotors in the numerical control machine tool based on a corresponding one of the position instruction values, and a plurality of detectors each of which detects a rotational position of a corresponding one of the servomotors and feeds back a position detection value indicative of detected rotational position to a corresponding one of the servo controllers, each of the servomotors driving a corresponding one of a plurality of shafts, at least one of the shafts being a clamp shaft that can be mechanically clamped and non-clamped, the numerical control apparatus further comprising:

a clamp determining unit that determines a state of the clamp shaft, the state including a clamping state in which the clamp shaft is clamped and a non-clamping state in which the clamp shaft is non-clamped, and outputs a clamp state signal indicative of the state of the clamp shaft; and a correcting unit that corrects at least one of a position instruction value and a position detection value corresponding to at least one shaft other than the clamp shaft based on the clamp state signal and a correction value so as to cancel an error in a position of the tool due to a movement of the tool performed by the clamp shaft.

2. The numerical control apparatus according to claim 1, wherein the correcting unit corrects at least one of the position instruction value and the position detection value so as to cancel an error in the position of the tool in a direction different from a direction of movement of the tool performed by the clamp shaft.

3. The numerical control apparatus according to claim 1, wherein the correcting unit includes
   a clamp correcting unit that corrects at least one of the position instruction value and the position detection value when the clamp state signal indicates that the clamp shaft is in the clamping state; and
   a non-clamp correcting unit that corrects at least one of the position instruction value and the position detection value when the clamp state signal indicates that the clamp shaft is in the non-clamping state.

4. The numerical control apparatus according to claim 3, wherein the non-clamp correcting unit corrects at least one of the position instruction value and the position detection value of the clamp shaft so as to cancel an error in the position of the tool in a direction of movement of the tool performed by the clamp shaft.

5. The numerical control apparatus according to claim 3, wherein the clamp correcting unit corrects at least one of the position instruction value and the position detection value of at least one shaft other than the clamp shaft so as to cancel an error in the position of the tool in a direction of movement of the tool performed by the clamp shaft.

6. A numerical control machine tool comprising:
   a workpiece holding apparatus configured to hold a workpiece;
   a tool configured to machine the workpiece;
   a machining head configured to hold the tool;
   a plurality of shafts configured to be controlled by the workpiece holding apparatus and the machining head so as to move the workpiece and the tool in different directions, the shafts including a clamp shaft;
   a plurality of servomotors each of which drives a corresponding one of the shafts;
   a clamp apparatus that mechanically clamps the clamp shaft; and
   a numerical control apparatus including
      a position instruction generating unit that generates and outputs a plurality of position instruction values indicative of a position of a tool of a numerical control machine tool;
      a plurality of servo controllers each of which controls a corresponding one of a plurality of servomotors in the numerical control machine tool based on a corresponding one of the position instruction values;
      a plurality of detectors each of which detects a rotational position of a corresponding one of the servomotors and feeds back a position detection value indicative of detected rotational position to a corresponding one of the servo controllers, each of the servomotors driving a corresponding one of a plurality of shafts, at least one of the shafts being a clamp shaft that can be mechanically clamped and non-clamped;
      a clamp determining unit that determines a state of the clamp shaft, the state including a clamping state in which the clamp shaft is clamped and a non-clamping state in which the clamp shaft is non-clamped, and outputs a clamp state signal indicative of the state of the clamp shaft; and
      a correcting unit that corrects at least one of a position instruction value and a position detection value corresponding to at least one shaft other than the clamp shaft based on the clamp state signal and a correction value so as to cancel an error in a position of the tool due to a movement of the tool performed by the clamp shaft.

* * * * *